United States Patent
Wang (10) Patent No.: US 12,093,206 B1
(45) Date of Patent: Sep. 17, 2024

(54) MULTI-MODE VIRTUAL SERIAL PORT CHIP, IMPLEMENTATION METHOD, AND FIRMWARE DOWNLOADING SYSTEM AND METHOD THEREOF

(71) Applicant: NANJING QINHENG MICROELECTRONICS CO., LTD., Nanjing (CN)

(72) Inventor: Chunhua Wang, Nanjing (CN)

(73) Assignee: NANJING QINHENG MICROELECTRONICS CO., LTD., Nanjing (CN)

( * ) Notice: Subject to any disclaimer, the term of this patent is extended or adjusted under 35 U.S.C. 154(b) by 0 days.

(21) Appl. No.: 18/262,205

(22) PCT Filed: Jan. 20, 2022

(86) PCT No.: PCT/CN2022/072882
§ 371 (c)(1),
(2) Date: Jul. 20, 2023

(87) PCT Pub. No.: WO2023/082469
PCT Pub. Date: May 19, 2023

(30) Foreign Application Priority Data

Nov. 9, 2021 (CN) .......................... 202111316629.3

(51) Int. Cl.
*G06F 13/14* (2006.01)
*G06F 9/4401* (2018.01)
*G06F 13/42* (2006.01)

(52) U.S. Cl.
CPC ........ *G06F 13/4282* (2013.01); *G06F 9/4401* (2013.01); *G06F 2213/0002* (2013.01)

(58) Field of Classification Search
None
See application file for complete search history.

(56) References Cited

U.S. PATENT DOCUMENTS 5,740,199 A * 4/1998 Sibigtroth ............. H04L 25/028
375/257
2007/0090848 A1* 4/2007 Tumin ............... G01R 31/3172
324/762.02
(Continued)

FOREIGN PATENT DOCUMENTS

CN 105487890 A 4/2016
CN 109558359 A 4/2019
(Continued)

*Primary Examiner* — Henry Tsai
*Assistant Examiner* — Dean Phan
(74) *Attorney, Agent, or Firm* — CBM PATENT CONSULTING, LLC (57) ABSTRACT

Disclosed are a multi-mode virtual serial port chip, an implementation method, and a firmware downloading system and method thereof. The multi-mode virtual serial port chip comprises a normal operating mode and an enhanced operating mode, which are selected by a multiplexed auxiliary signal pin according to that whether there is a pull-down resistor connected thereto. The normal operating mode is compatible with the prior art and applications, and one-click automatic MCU firmware downloading can also be realized in the enhanced operating mode. In the present invention, no peripheral circuit is needed, the MCU also cannot unintentionally enter other modes, and the effects of automatically downloading firmware, improving downloading efficiency, reducing costs, reducing power consumption and decreasing product volume are achieved.

10 Claims, 3 Drawing Sheets

(56) References Cited

U.S. PATENT DOCUMENTS

2019/0116321 A1* 4/2019 Grimm ............ H04N 21/41407
2021/0109668 A1* 4/2021 Kale ..................... G06F 3/0604

FOREIGN PATENT DOCUMENTS

| CN | 109800012 A | 5/2019 |
| CN | 111273938 A | 6/2020 |
| CN | 111758088 A | 10/2020 |

* cited by examiner

MULTI-MODE VIRTUAL SERIAL PORT CHIP, IMPLEMENTATION METHOD, AND FIRMWARE DOWNLOADING SYSTEM AND METHOD THEREOF

TECHNICAL FIELD

The present invention belongs to the field of virtual serial port chip design, and particularly relates to a multi-mode virtual serial port chip, an implementation method, a firmware downloading system and method thereof.

BACKGROUND

Serial port (i.e., UART) has been widely used as MCU firmware (or MCU embedded software) downloading interface, and there are more and more startup modes of the MCU. With the wider use of the MCU, the industry pays more attention to the firmware downloading efficiency of the MCU and the volume cost of hardware circuits, and an economical and efficient firmware downloading method becomes particularly important.

Figure 1:
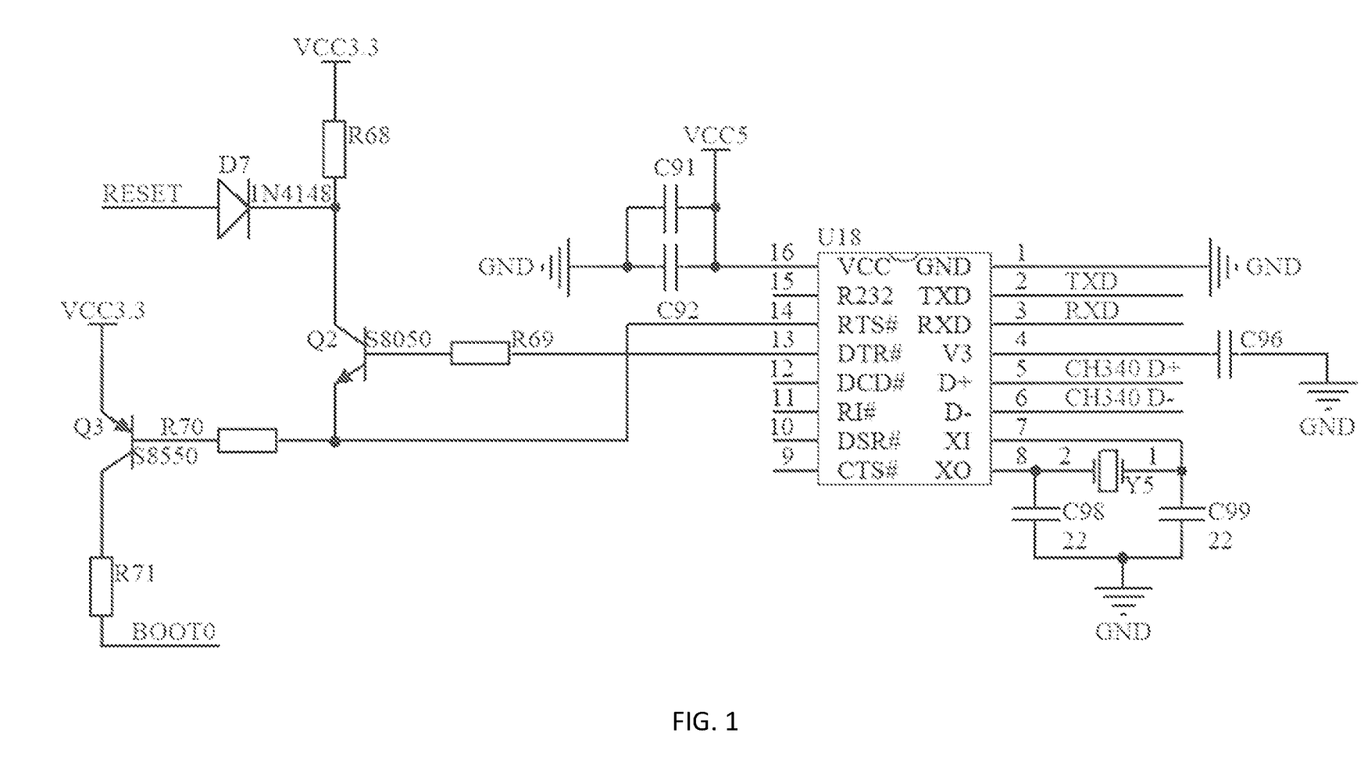
FIG. 1 is a schematic circuit diagram showing connection between a virtual serial port chip CH340 and a MCU in the prior art.

Based on the requirements of native serial port (usually model 16C450/550), in a default state of an IO pin type of a universal serial port chip, input signal CTS/DSR/RI/DCD pins of a MODEM show an input direction, and output signal RTS/DTR pins of the MODEM show an output direction, and the default state of the output pins is at a high level (corresponding to RS232 level logic 0). In the prior art, RTS/DTR are used as mode selection pins to control a BootMode (or boot mode or downloading mode) pin of the MCU, and when the MCU is reset, it is determined which startup mode to enter according to high and low level states of the mode selection pin. For the MCUs whose mode pins are at a low level in a normal state and enter a BOOT mode when at a high level, such as STM32F, CH32F, GD32F and other series MCU, this pin should be at a high level if a serial port is needed for firmware downloading. If a user program needs to be run, this pin should be at a low level. Due to the fact that the serial port is default to be at a high level, the MCU may directly enter the BOOT mode after being powered on, a MCU starting mode may enter an unexpected mode when the serial port and the MCU are powered on and off, the serial port driver is not loaded, and the serial port is not opened, which will affect the use of the MCU. As shown in FIG. 1, taking a virtual serial chip CH340 as an example, in order to avoid the above problems, in the prior art, logic circuits such as resistors and triodes are generally added to assist the level mutual exclusion and level maintenance of the serial output pin RTS/DTR, as shown in triodes Q2 and Q3, resistors R69, R70 and R71 in FIG. 1 to avoid entering the firmware downloading mode after power-on and reset.

The application of the serial port is very extensive and convenient, but at present, computers or mobile phones are generally not provided with native serial ports, and generally use USB or BLE Bluetooth to expand virtual serial ports, and then communicate with the MCU or download firmware. Considering the compatibility of the serial ports, serial port applications mainly support native serial port operations, such as serial port transceiver, modem output setting and modem input reading. Virtual serial port refers to a serial port that is physically connected and expanded by USB or Bluetooth, and imitates functions and effects of a native serial port of an upper computer (that is, computer, server or mobile phone) through a driver, so that behavior characteristics of the virtual serial port are basically compatible with the native serial port. Due to the compatibility, the MCU firmware downloading based on the virtual serial chip will encounter the same problem as the native serial port. How to download the MCU firmware economically and efficiently based on the virtual serial chip is an urgent problem to be solved.

SUMMARY

Object of the present invention: in order to solve the problems in the prior art and enable a virtual serial port chip to solve a problem that a MCU enters a wrong startup mode without adding a peripheral circuit, the present invention provides a multi-mode virtual serial port chip, an implementation method, a firmware download system and method thereof.

Technical solutions: a multi-mode virtual serial port chip comprises:

a multiplexed auxiliary signal pin, which is internally provided with a weak pull-up resistor or a weak pull-up current, determines to enter a normal operating mode or an enhanced operating mode of the multi-mode virtual serial port chip according to that whether a pull-down resistor is connected thereto, and is a pre-determined auxiliary signal output or first modem signal output function in the normal operating mode; and is able to switch between no output and the first modem signal output function in the enhanced operating mode, which is used for controlling a BootMode pin of a MCU;

a second modem output pin, which is used for outputting a second modem signal and also used for controlling the reset of the MCU in the enhanced operating mode; and a memory, a processor and a software program stored in the memory and executable by the processor, wherein when the chip is in the enhanced operating mode, the processor executes the software program to switch the multiplexed auxiliary signal pin to the first modem signal output function and output a high level when receiving a modem output setting command sent by an upper computer and designating a first modem signal as a high level signal;

when the chip is in the enhanced operating mode, the processor executes the software program to prevent the multiplexed auxiliary signal pin from outputting a high level when entering a sleep state, or receiving a serial port closing command sent by the upper computer, or receiving the modem output setting command sent by the upper computer and designating the first modem signal as a low level signal; and when the chip is in the enhanced operating mode and awakened from the sleep state, the software program is executed to reset the multiplexed auxiliary signal pin to the function before sleep.

Further, when the chip is in the enhanced operating mode, the processor executes the software program to switch the multiplexed auxiliary signal pin to no output when entering the sleep state, or receiving the serial port closing command sent by the upper computer, or receiving the modem output setting command sent by the upper computer and designating the first modem signal as a low level signal.

Further, when the chip is in the enhanced operating mode, the processor executes the software program to switch the multiplexed auxiliary signal pin to no output when entering the sleep state, or receiving the serial port closing command sent by the upper computer; and the processor executes the software program to switch the multiplexed auxiliary signal pin to the first modem signal output function and output a low level when receiving the modem output setting command sent by the upper computer and designating the first modem signal as a low level signal.

Further, the second modem output pin is a pin RTS, and the multiplexed auxiliary signal pin is a modem pin DTR under a modem signal output function of the enhanced operating mode.

An implementation method of a multi-mode virtual serial port chip comprises the following steps of:
  step 1: detecting whether a multiplexed auxiliary signal pin is connected to a pull-down resistor after power-on or reset, and when no pull-down resistor is connected, the chip entering a normal operating mode, and executing step 2; and when the pull-down resistor is connected, the chip entering an enhanced operating mode, and executing step 3;
  step 2: regardless of receiving a serial port opening command or a serial port closing command sent by an upper computer, the multiplexed auxiliary signal pin being always a pre-determined auxiliary signal output or first modem signal output function, and outputting a needed level according to an inherent auxiliary function rule of the multiplexed auxiliary signal pin or according to a modem output setting command sent by the upper computer; and
  step 3: when receiving the modem output setting command sent by the upper computer and designating a first modem signal as a high level signal, switching the multiplexed auxiliary signal pin to the modem signal output function and outputting a high level according to the setting for controlling a MCU to enter a BOOT mode;
  when entering a sleep state, or receiving the serial port closing command sent by the upper computer, or receiving the modem output setting command sent by the upper computer and designating the first modem signal as a low level signal, not outputting a high level by the multiplexed auxiliary signal pin; and
  when the multi-mode virtual serial port chip is awakened from the sleep state, resetting the multiplexed auxiliary signal pin to the function before sleep.

A firmware downloading system comprises an upper computer, a MCU and the multi-mode virtual serial port chip above, wherein a multiplexed auxiliary signal pin of the multi-mode virtual serial port chip is connected to a Boot-Mode pin of the MCU, and the multiplexed auxiliary signal pin of the multi-mode virtual serial port chip is connected to a pull-down resistor, and a second modem output pin of the multi-mode virtual serial port chip is connected with a reset pin of the MCU; the upper computer is connected to the multi-mode virtual serial port chip; and the MCU is a MCU with the BootMode pin at a low level in a normal state, and entering a BOOT mode at a high level.

Further, the firmware downloading system further comprises a peripheral circuit of the MCU, wherein a BootMode pin in the peripheral circuit of the MCU is connected to a pull-down resistor, and the pull-down resistor connected to the multiplexed auxiliary signal pin is shared with the pull-down resistor connected to the BootMode pin in the peripheral circuit of the MCU.

Further, a second modem output pin of the multi-mode virtual serial port chip is directly connected to the reset pin of the MCU or connected by means of a diode, a positive electrode of the diode is connected to the reset pin of the MCU, and a negative electrode of the diode is connected to the second modem output pin.

A firmware downloading method comprises the following steps of:
  step 1: detecting, by a multi-mode virtual serial port chip, whether a multiplexed auxiliary signal pin is connected to a pull-down resistor, and when no pull-down resistor is connected, the chip entering a normal operating mode, and the multiplexed auxiliary signal pin being always a pre-determined auxiliary signal output or first modem signal output function; and when the pull-down resistor is connected, the chip entering an enhanced operating mode, and executing step 2;
  step 2: sending, by an upper computer, a modem output setting command to the multi-mode virtual serial port chip, designating a first modem signal as a high level signal in the modem output command, switching the multiplexed auxiliary signal pin to a modem signal output function and outputting a high level; and setting a second modem output pin to output a level same as an effective reset signal of a MCU, and starting, by the MCU, a firmware downloading mode as a BootMode pin is at a high level when resetting;
  step 3: sending, by the upper computer, the modem output setting command to the multi-mode virtual serial port chip, setting the second modem output pin to output a level opposite to the effective reset signal of the MCU, and ending resetting and automatically executing a firmware downloading program by the MCU; and
  step 4: when the MCU firmware downloading is completed, sending, by the upper computer, the modem output setting command to the multi-mode virtual serial port chip, designating the first modem signal as a low level signal, and designating the second modem output pin to output the effective reset signal of the MCU, so that the multiplexed auxiliary signal pin does not output a high level, and starting, by the MCU, a user program mode as the BootMode pin is at a low level when resetting.

Further, the step 4 comprises: when the MCU firmware downloading is completed, sending, by the upper computer, the modem output setting command to the multi-mode virtual serial port chip, designating the first modem signal as a low level signal, and designating the second modem output pin to output the effective reset signal of the MCU, switching the multiplexed auxiliary signal pin to no output, and starting, by the MCU, the user program mode as the Boot-Mode pin is at a low level when resetting;
  or comprises: when the MCU firmware downloading is completed, sending, by the upper computer, the modem output setting command to the multi-mode virtual serial port chip, designating the first modem signal as a low level signal, and designating the second modem output pin to output the effective reset signal of the MCU, outputting a low level by the multiplexed auxiliary signal pin, and starting, by the MCU, the user program mode as the BootMode pin is at a low level when resetting; and sending, by the upper computer, a serial port closing command to the multi-mode virtual serial port chip, or disconnecting the chip from the upper computer and making the chip enter a sleep state, and switching the multiplexed auxiliary signal pin to no output.

Compared with the prior art, the multi-mode virtual serial port chip and the implementation method thereof, the firmware automatic downloading system and method thereof provided by the present invention have the following beneficial effects:

(1) In the normal operating mode, the multi-mode virtual serial port chip, the implementation method, and the firmware downloading system and the method thereof are compatible with the existing virtual serial port and native serial port, and compatible with the existing applications. In the enhanced operating mode, the one-click MCU firmware downloading can be realized without adding any devices by using the pull-down resistor of the BootMode pin in the peripheral circuit of the MCU, and only the modem output setting command compatible with the native serial port is used, which is convenient for application compatibility.

(2) In the enhanced operating mode, the multi-mode virtual serial port chip, the implementation method, and the firmware downloading system and the method thereof may be used in the MCU with the BootMode pin at the low level in the normal state, and entering the BOOT mode at the high level. Two application environments of the virtual serial port are defined: the normal application environment is compatible with the prior art; and the one-click automatic MCU firmware downloading can be realized in the downloading application environment, i.e., the enhanced operating mode. It is a normal application environment when the multiplexed auxiliary signal pin has no pull-down resistor, the virtual serial port chip enters the normal operating mode, and the auxiliary signal pin is determined to output the required level either as an auxiliary signal such as TNOW or as a modem signal output pin DTR according to different chip packaging forms or sub-models, so as to be compatible with the prior art and habits. It is a downloading application environment when the auxiliary signal pin is connected to the pull-down resistor for the need of realizing the realizing the one-click MCU firmware downloading function. The virtual serial chip enters the enhanced operating mode. In the enhanced operating mode, the auxiliary signal pin may be switched to a modem signal output pin when necessary, which can realize the one-click MCU firmware downloading function. As for the pull-down resistor, the pull-down resistor of the BootMode pin in the peripheral circuit of the MCU may be directly used, without adding any additional pull-down resistor. The pull-down resistor has the dual functions of simultaneously determining which mode to enter and not entering the BOOT mode when the serial port is not opened in the enhanced operating mode.

(3) In the enhanced operating mode, as long as the upper computer software is not operated, a MCU user program will not be affected by default. The MCU may not enter the wrong startup mode by mistake due to the factors that the MCU and the serial port are powered on and off, the serial port driver is not loaded, and the serial port is not opened. The startup mode of the MCU is automatically switched without manual participation or circuit assistance, and the product stability is better.

(4) The multi-mode virtual serial port chip is directly connected to the relevant pin of the MCU, and there is no need to add logic control circuits such as resistors and triodes, thus eliminating the difficulty of debugging and production. No peripheral circuit is provided, which saves the device cost and the manufacturing cost, greatly reduces the product volume, reduces the power consumption caused by multiple resistors, and reduces the product failure rate.

(5) The technical solutions still only use an operating command of the native serial port, which is imperceptible to the operating user of the upper computer, and is still compatible with the existing upper computer user program in the normal operating mode without changing the user application program. On the premise of maintaining forward compatibility, more functions are realized.

DETAILED DESCRIPTION

The present invention will be further illustrated below with reference to the accompany drawings and specific embodiments.

First Embodiment

This embodiment is directed to a MCU with a BootMode pin normally at a low level. When the BootMode pin is at a high level, the MCU is reset to enter a firmware downloading mode, that is, an effective level of the BootMode pin entering a BOOT mode is a high level.

Two operating modes are defined for a multi-mode virtual serial port chip: a normal operating mode and an enhanced operating mode. The normal operating mode is an operating mode used in the prior art so as to be compatible with the existing virtual serial port chip. However, one-click automatic firmware downloading cannot be realized in this mode as the MCU may enter a wrong startup mode by mistake due to the factors that the MCU and the serial port are powered on and off, a serial port driver is not loaded, and the serial port is not opened. It is only able to rely on manual reset and other operations to maintain normal work when it is expected to not add peripheral triodes and other devices to an auxiliary signal pin. As two operating modes are set in the virtual serial port chip, a pull-down resistor may be connected according to needs to further select which mode to enter. The normal operating mode is compatible with the prior art. In the enhanced operating mode, one-key automatic MCU firmware downloading can be realized, and the MCU is prevented from entering the wrong startup mode.

Figure 2:
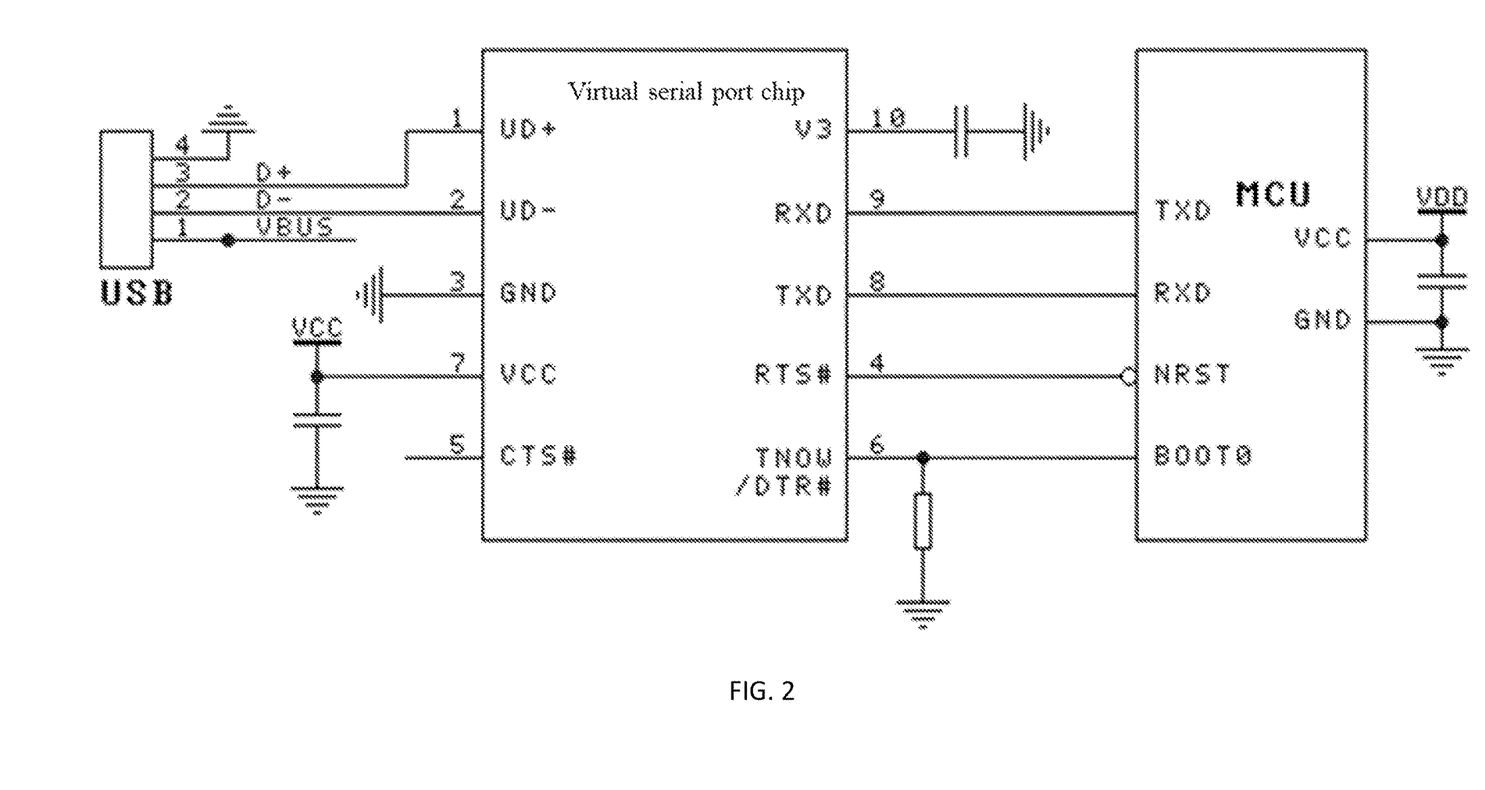
FIG. 2 is a schematic circuit diagram showing connection between a multi-mode virtual serial port chip according to a first embodiment and a MCU.

A multi-mode virtual serial port chip comprises:

a multiplexed auxiliary signal pin, as TNOW/DTR shown in FIG. 2, the multiplexed auxiliary signal pin is internally provided with a weak pull-up resistor or a weak pull-up current, and determines to enter a normal operating mode or an enhanced operating mode according to that whether a pull-down resistor is externally connected thereto; in this embodiment, the multiplexed auxiliary signal pin in the normal operating mode is a pre-determined auxiliary signal output (TNOW in the figure) or first modem signal (Modem) output function; and in the enhanced operating mode, the multiplexed auxiliary signal pin may be switched to a modem signal output function or no output according to a modem output setting command, a serial port closing command or entering a sleep state, which is used for controlling a BootMode pin of a MCU;

a second modem output pin (Modem output pin), as a pin RTS in FIG. 2, which is used for outputting a second modem signal and also used for controlling the reset of the MCU in the enhanced operating mode; and a memory, a processor and a software program stored in the memory and executable by the processor.

When the chip is in the enhanced operating mode, the processor executes the software program to switch the multiplexed auxiliary signal pin to the first modem signal output function and output a high level when receiving a modem output setting command sent by an upper computer and designating a first modem signal as a high level signal;

when the chip is in the enhanced operating mode, the processor executes the software program to switch the multiplexed auxiliary signal pin to no output when entering a sleep state, or receiving a serial port closing command sent by the upper computer, or receiving the modem output setting command sent by the upper computer and designating the first modem signal as a low level signal; and when the chip is in the enhanced operating mode and awakened from the sleep state, the software program is executed to reset the multiplexed auxiliary signal pin to the function before sleep.

Because the multiplexed auxiliary signal pin is connected to the pull-down resistor, when the multiplexed auxiliary signal pin is under the function of no output, the BootMode pin of the MCU is at a low level under the action of the pull-down resistor, maintaining the user program mode and not entering the BOOT firmware downloading mode. Therefore, the pull-down resistor has the dual functions of simultaneously determining which mode to enter and not entering the BOOT mode when the serial port is not opened in the enhanced operating mode.

An implementation method of a multi-mode virtual serial port chip comprises the following steps of:

step 1: detecting whether a multiplexed auxiliary signal pin is connected to a pull-down resistor after power-on or reset, and when no pull-down resistor is connected, the chip entering a normal operating mode, and executing step 2; and when the pull-down resistor is connected, the chip entering an enhanced operating mode, and executing step 3;

step 2: regardless of receiving a serial port opening command or a serial port closing command sent by an upper computer, the multiplexed auxiliary signal pin being always a pre-determined auxiliary signal output or first modem signal output function, and outputting a needed level according to an inherent auxiliary function rule of the multiplexed auxiliary signal pin or according to a modem output setting command sent by the upper computer; and step 3: when receiving the modem output setting command sent by the upper computer and designating a first modem signal as a high level signal, switching the multiplexed auxiliary signal pin to the modem signal output function and outputting a high level according to the setting for controlling a MCU to enter a BOOT mode;

when entering a sleep state, or receiving the serial port closing command sent by the upper computer, or receiving the modem output setting command sent by the upper computer and designating the first modem signal as a low level signal, switching the multiplexed auxiliary signal pin to no output; and when the multi-mode virtual serial port chip is awakened from the sleep state, resetting the multiplexed auxiliary signal pin to the function before sleep.

A firmware downloading system comprises an upper computer, a MCU and the multi-mode virtual serial port chip above. As shown in FIG. 2, a multiplexed auxiliary signal pin of the multi-mode virtual serial port chip is connected to a BootMode pin of the MCU, and the multiplexed auxiliary signal pin of the multi-mode virtual serial port chip is connected to a pull-down resistor, and a second modem output pin of the multi-mode virtual serial port chip is connected with a reset pin of the MCU. The upper computer is connected to the multi-mode virtual serial port chip; and the MCU is a MCU with the BootMode pin at a low level in a normal state, and entering a BOOT mode at a high level. Generally, the pull-down resistor has a value from 1 kΩ to 20 kΩ, and 4.7 kΩ is selected in this embodiment.

A firmware downloading method comprises the following steps of:

step 1: determining which operating mode to enter first: detecting, by a multi-mode virtual serial port chip, whether a multiplexed auxiliary signal pin is connected to a pull-down resistor, and when no pull-down resistor is connected, the chip entering a normal operating mode, and the multiplexed auxiliary signal pin being always a pre-determined auxiliary signal output or first modem signal output function, and the multiplexed auxiliary signal pin outputting a needed level according to a modem output setting command sent by an upper computer, and not realizing automatic MCU firmware downloading; and when the pull-down resistor is connected, the chip entering an enhanced operating mode, and executing step 2;

step 2: sending, by an upper computer, a modem output setting command to the multi-mode virtual serial port chip, designating a first modem signal as a high level signal in the modem output command, switching the multiplexed auxiliary signal pin to a modem signal output function and outputting a high level; and setting a second modem output pin to output a level same as an effective reset signal of a MCU, and starting, by the MCU, a firmware downloading mode as a BootMode pin is at a high level when resetting;

step 3: sending, by the upper computer, the modem output setting command to the multi-mode virtual serial port chip, setting the second modem output pin to output a level opposite to the effective reset signal of the MCU, and ending resetting and automatically executing a firmware downloading program by the MCU; and step 4: when the firmware downloading is completed, sending, by the upper computer, the modem output setting command to the multi-mode virtual serial port chip, designating the first modem signal as a low level signal, and designating the second modem output pin to output the effective reset signal of the MCU, switching the multiplexed auxiliary signal pin to no output, and starting, by the MCU, a user program mode as the BootMode pin is at a low level when resetting.

Second Embodiment

Compared with the first embodiment, the second embodiment is different in that the pull-down resistor connected to the multiplexed auxiliary signal pin may be shared with the pull-down resistor connected to the peripheral circuit of the MCU. When the BootMode pin in the peripheral circuit of the MCU is connected to the pull-down resistor, the pull-down resistor may be fully utilized as a condition for the multi-mode virtual serial port chip to enter the enhanced operating mode, and no additional pull-down resistor is needed.

Third Embodiment

Compared with the first embodiment and the second embodiment, the third embodiment is different in that the processor executes the software program to switch the multiplexed auxiliary signal pin to the first modem signal output function and output a low level when the multi-mode virtual serial port chip receives the modem output setting command sent by the upper computer and designating the first modem signal as a low level signal. Through the first embodiment, it can be seen that when the multiplexed auxiliary signal pin does not output, the BootMode pin is guaranteed to be at a low level under the action of the externally connected pull-down resistor. However, the low level output by the multiplexed auxiliary signal pin in this embodiment has the same effect. In addition, in the enhanced operating mode, when the multi-mode virtual serial port chip enters the sleep state or receives the serial port closing command sent by the upper computer, the multiplexed auxiliary signal pin may also output a low level, as long as not outputting a high level.

Correspondingly, an implementation method of a multi-mode virtual serial port chip comprises the following steps of:

step 1: detecting whether a multiplexed auxiliary signal pin is connected to a pull-down resistor after power-on or reset, and when no pull-down resistor is connected, the chip entering a normal operating mode, and executing step 2; and when the pull-down resistor is connected, the chip entering an enhanced operating mode, and executing step 3;

step 2: regardless of receiving a serial port opening command or a serial port closing command sent by an upper computer, the multiplexed auxiliary signal pin being always a pre-determined auxiliary signal output or first modem signal output function, and outputting a needed level according to an inherent auxiliary function rule of the multiplexed auxiliary signal pin or according to a modem output setting command sent by the upper computer; and step 3: when receiving the modem output setting command sent by the upper computer and designating a first modem signal as a high level signal, switching the multiplexed auxiliary signal pin to the modem signal output function and outputting a high level according to the setting for controlling a MCU to enter a BOOT mode;

when entering a sleep state, or receiving the serial port closing command sent by the upper computer, switching the multiplexed auxiliary signal pin to no output; and when receiving the modem output setting command sent by the upper computer and designating the first modem signal as a low level signal, outputting, by the multiplexed auxiliary signal pin, a low level; and when the multi-mode virtual serial port chip is awakened from the sleep state, resetting the multiplexed auxiliary signal pin to the function before sleep.

A firmware downloading method comprises the following process steps of:

step 1: determining which operating mode to enter first: detecting, by a multi-mode virtual serial port chip, whether a multiplexed auxiliary signal pin is connected to a pull-down resistor, and when no pull-down resistor is connected, the chip entering a normal operating mode, and the multiplexed auxiliary signal pin being always an output function, and when an upper computer sends a serial port opening command to the virtual serial port chip, the multiplexed auxiliary signal pin outputting a needed level according to an inherent auxiliary function rule thereof or the command sent by the upper computer, and not realizing automatic MCU firmware downloading; and when the pull-down resistor is connected, the chip entering an enhanced operating mode, and executing step 2;

step 2: sending, by an upper computer, a modem output setting command to the multi-mode virtual serial port chip, designating a first modem signal as a high level signal in the modem output command, switching the multiplexed auxiliary signal pin to a modem signal output function and outputting a high level; and setting a second modem output pin to output a level same as an effective reset signal of a MCU, and starting, by the MCU, a firmware downloading mode as a BootMode pin is at a high level when resetting;

step 3: sending, by the upper computer, the modem output setting command to the multi-mode virtual serial port chip, setting the second modem output pin to output a level opposite to the effective reset signal of the MCU, and ending resetting and automatically executing a firmware downloading program by the MCU; and step 4: when the MCU firmware downloading is completed, sending, by the upper computer, the modem output setting command to the multi-mode virtual serial port chip, designating the first modem signal as a low level signal, and designating the second modem output pin to output the effective reset signal of the MCU, outputting, by the multiplexed auxiliary signal pin, a low level, and starting, by the MCU, a user program mode as the BootMode pin is at a low level when resetting; and sending, by the upper computer, a serial port closing command to the multi-mode virtual serial port chip, or disconnecting the chip from the upper computer and making the chip enter a sleep state, and switching the multi-mode virtual serial port chip to no output.

Fourth Embodiment

Figure 3:
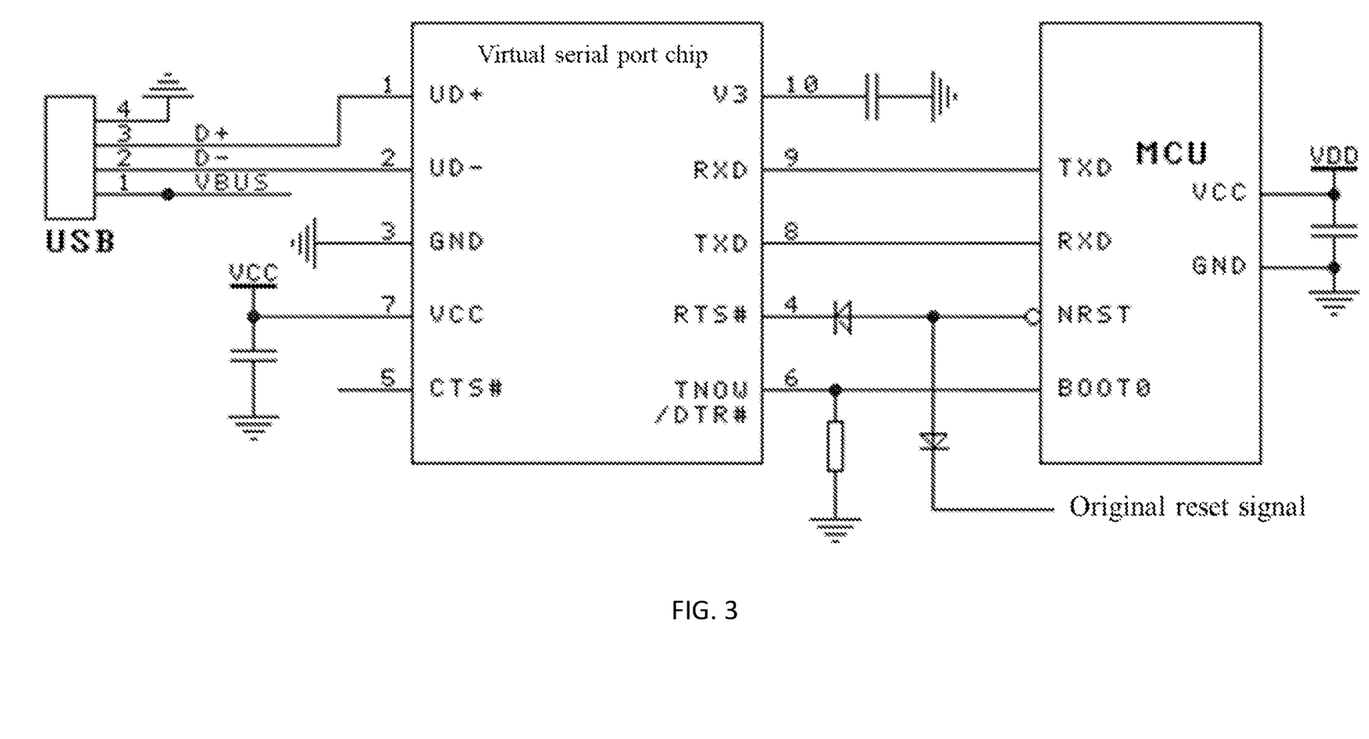
FIG. 3 is a schematic circuit diagram showing connection between a multi-mode virtual serial port chip according to a fourth embodiment and a MCU.

Compared with the first embodiment, or the second embodiment, or the third embodiment, the fourth embodiment is different in that, as shown in FIG. 3, a diode is connected between a modem output pin RTS of the multi-mode virtual serial port chip and the reset pin of the MCU. A positive electrode of the diode is connected to the reset pin of the MCU, and a negative electrode of the diode is connected to a modem output pin RTS, which is intended to add the RTS pin of the virtual serial chip to directly act NRST on the basis of compatibility with the original reset signal control.

What is claimed is:

1. A multi-mode virtual serial port chip, comprising:
a multiplexed auxiliary signal pin, which is internally provided with a weak pull-up resistor or a weak pull-up current, determines to enter a normal operating mode or an enhanced operating mode of the multi-mode virtual serial port chip according to that whether a pull-down resistor is externally connected thereto, and is a pre-determined auxiliary signal output or first modem signal output function in the normal operating mode; and is able to switch between no output and the first modem signal output function in the enhanced operating mode, which is used for controlling a BootMode pin of a MCU;

a second modem output pin, which is used for outputting a second modem signal and also used for controlling the reset of the MCU in the enhanced operating mode; and a memory, a processor and a software program stored in the memory and executable by the processor, wherein when the chip is in the enhanced operating mode, the processor executes the software program to switch the multiplexed auxiliary signal pin to the first modem signal output function and output a high level when receiving a modem output setting command sent by an upper computer and designating a first modem signal as a high level signal;

when the chip is in the enhanced operating mode, the processor executes the software program to prevent the multiplexed auxiliary signal pin from outputting a high level when entering a sleep state, or receiving a serial port closing command sent by the upper computer, or receiving the modem output setting command sent by the upper computer and designating the first modem signal as a low level signal; and when the chip is in the enhanced operating mode and awakened from the sleep state, the software program is executed to reset the multiplexed auxiliary signal pin to the function before sleep.

2. The multi-mode virtual serial port chip according to claim 1, wherein when the chip is in the enhanced operating mode, the processor executes the software program to switch the multiplexed auxiliary signal pin to no output when entering the sleep state, or receiving the serial port closing command sent by the upper computer, or receiving the modem output setting command sent by the upper computer and designating the first modem signal as a low level signal.

3. The multi-mode virtual serial port chip according to claim 1, wherein when the chip is in the enhanced operating mode, the processor executes the software program to switch the multiplexed auxiliary signal pin to no output when entering the sleep state, or receiving the serial port closing command sent by the upper computer; and the processor executes the software program to switch the multiplexed auxiliary signal pin to the first modem signal output function and output a low level when receiving the modem output setting command sent by the upper computer and designating the first modem signal as a low level signal.

4. The multi-mode virtual serial port chip according to claim 1, wherein the second modem output pin is a pin RTS, and the multiplexed auxiliary signal pin is a modem pin DTR under a modem signal output function of the enhanced operating mode.

5. The multi-mode virtual serial port chip according to claim 1, wherein the multi-mode virtual serial port chip is utilized by the following steps of:

step 1: detecting whether the multiplexed auxiliary signal pin is connected to a pull-down resistor after power-on or reset, and when no pull-down resistor is connected, the chip entering a normal operating mode, and executing step 2; and when the pull-down resistor is connected, the chip entering an enhanced operating mode, and executing step 3;

step 2: regardless of receiving a serial port opening command or a serial port closing command sent by an upper computer, the multiplexed auxiliary signal pin being always a pre-determined auxiliary signal output or first modem signal output function, and outputting a needed level according to an inherent auxiliary function rule of the multiplexed auxiliary signal pin or according to a modem output setting command sent by the upper computer; and step 3: when receiving the modem output setting command sent by the upper computer and designating a first modem signal as a high level signal, switching the multiplexed auxiliary signal pin to the modem signal output function and outputting a high level according to the setting for controlling a MCU to enter a BOOT mode;

when entering a sleep state, or receiving the serial port closing command sent by the upper computer, or receiving the modem output setting command sent by the upper computer and designating the first modem signal as a low level signal, not outputting a high level by the multiplexed auxiliary signal pin; and when the virtual serial port chip is awakened from the sleep state, resetting the multiplexed auxiliary signal pin to the function before sleep.

6. A firmware downloading system, comprising an upper computer, a MCU and the multi-mode virtual serial port chip according to claim 1, wherein a multiplexed auxiliary signal pin of the multi-mode virtual serial port chip is connected to a BootMode pin of the MCU, and the multiplexed auxiliary signal pin of the multi-mode virtual serial port chip is connected to a pull-down resistor, and a second modem output pin of the multi-mode virtual serial port chip is connected with a reset pin of the MCU; the upper computer is connected to the multi-mode virtual serial port chip; and the BootMode pin of the MCU is at a low level in a normal state, and the MCU enters a Boot mode of the MCU at a high level.

7. The firmware downloading system according to claim 6, further comprising a peripheral circuit of the MCU, wherein a BootMode pin in the peripheral circuit of the MCU is connected to a pull-down resistor, and the pull-down resistor connected to the multiplexed auxiliary signal pin is shared with the pull-down resistor connected to the BootMode pin in the peripheral circuit of the MCU.

8. The firmware downloading system according to claim 6, wherein a second modem output pin of the multi-mode virtual serial port chip is directly connected to the reset pin of the MCU or connected by means of a diode, a positive electrode of the diode is connected to the reset pin of the MCU, and a negative electrode of the diode is connected to the second modem output pin.

9. A firmware downloading method, comprising the following steps of:

step 1: detecting, by a multi-mode virtual serial port chip, whether a multiplexed auxiliary signal pin is connected to a pull-down resistor, and when no pull-down resistor is connected, the chip entering a normal operating mode, and the multiplexed auxiliary signal pin being always a pre-determined auxiliary signal output or first modem signal output function; and when the pull-down resistor is connected, the chip entering an enhanced operating mode, and executing step 2;

step 2: sending, by an upper computer, a modem output setting command to the multi-mode virtual serial port chip, designating a first modem signal as high level signal in the modem output command, switching the multiplexed auxiliary signal pin to a modem signal output function and outputting a high level; and setting a second modem output pin to output a level same as an effective reset signal of a MCU, and starting, by the MCU, a firmware downloading mode as a BootMode pin is at a high level when resetting;

step 3: sending, by the upper computer, the modem output setting command to the multi-mode virtual serial port chip, setting the second modem output pin to output a level opposite to the effective reset signal of the MCU, and ending resetting and automatically executing a firmware downloading program by the MCU; and step 4: when the MCU firmware downloading is completed, sending, by the upper computer, the modem output setting command to the multi-mode virtual serial port chip, designating the first modem signal as a low level signal, and designating the second modem output pin to output the effective reset signal of the MCU, so that the multiplexed auxiliary signal pin does not output a high level, and starting, by the MCU, a user program mode as the BootMode pin is at a low level when resetting.

10. The firmware downloading method according to claim 9, wherein the step 4 comprises: when the MCU firmware downloading is completed, sending, by the upper computer, the modem output command to the multi-mode virtual serial port chip, designating the first modem signal as a low level signal, and designating the second modem output pin to output the effective reset signal of the MCU, switching the multiplexed auxiliary signal pin to no output, and starting, by the MCU, the user program mode as the BootMode pin is at a low level when resetting;

or comprising: when the MCU firmware downloading is completed, sending, by the upper computer, the modem output setting command to the multi-mode virtual serial port chip, designating the first modem signal as a low level signal, and designating the second modem output pin to output the effective reset signal of the MCU, outputting a low level by the multiplexed auxiliary signal pin, and starting, by the MCU, the user program mode as the BootMode pin is at a low level when resetting; and sending, by the upper computer, a serial port closing command to the multi-mode virtual serial port chip, or disconnecting the chip from the upper computer and making the chip enter a sleep state, and switching the multiplexed auxiliary signal pin to no output.

* * * * *